(12) United States Patent
Vaders

(10) Patent No.: US 6,203,738 B1
(45) Date of Patent: Mar. 20, 2001

(54) METHOD FOR PROVIDING MORE UNIFORM DENSITY IN THE MANUFACTURE OF LIGHTWEIGHT STRUCTURAL FIBERBOARD PANELS

(75) Inventor: Dennis H. Vaders, Elkin, NC (US)

(73) Assignee: Masonite Corporation, Chicago, IL (US)

( * ) Notice: Subject to any disclaimer, the term of this patent is extended or adjusted under 35 U.S.C. 154(b) by 0 days.

(21) Appl. No.: 09/280,773

(22) Filed: Mar. 29, 1999

(51) Int. Cl.⁷ .................. B29C 33/42; B29C 43/40; B29C 59/02
(52) U.S. Cl. .............. 264/156; 264/293; 264/322
(58) Field of Search .................... 264/156, 293, 264/322

(56) References Cited

U.S. PATENT DOCUMENTS

| | | |
|---|---|---|
| 266,763 | 10/1882 | Burke . |
| 839,680 | 12/1906 | Voigt . |
| 1,675,042 | 6/1928 | Nelson . |
| 3,231,455 | 1/1966 | Campbell, III et al. ............. 161/124 |
| 3,675,692 | * 7/1972 | Jeans ................. 264/322 X |
| 4,007,076 | 2/1977 | Clarke et al. ....... 156/62.2 |
| 4,706,722 | 11/1987 | Silcox ........................ 144/329 |
| 4,790,360 | 12/1988 | Clarke et al. ............ 144/213 |
| 4,836,254 | 6/1989 | Ruddick ................ 144/362 |
| 4,850,404 | 7/1989 | Koba ..................... 144/2 R |
| 5,048,581 | 9/1991 | Pierson et al. ........... 144/362 |
| 5,129,435 | 7/1992 | Beuving et al. ........ 144/2 R |
| 5,161,591 | 11/1992 | Sealey et al. ........... 144/362 |
| 5,179,986 | 1/1993 | Beuving et al. ....... 144/362 |
| 5,489,460 | 2/1996 | Clarke et al. .......... 428/106 |
| 5,529,100 | 6/1996 | Koba ..................... 144/2.1 |
| 5,614,231 | 3/1997 | Rinker ................... 425/394 |

FOREIGN PATENT DOCUMENTS 2 237 531 * 5/1991 (GB) ................... 264/322

* cited by examiner

Primary Examiner—Leo B. Tentoni
(74) Attorney, Agent, or Firm—Marshallo, O'Toole, Gerstein, Murray & Borun

(57) ABSTRACT

A fiberboard mat, whether made by a dry process, a wet process, or dry/wet combination thereof, can be consolidated against a fiber displacement die, contacting and penetrating into a back major surface of the fiberboard mat, to provide fiber-void regions, to achieve a lighter panel, while achieving fiber savings and while maintaining structural integrity and substantially uniform density in the fiber-containing regions. The fiber displacement die includes a plurality of pointed projections that serve to laterally displace fibers, during consolidation of the mat. The displaced fibers are held in their displaced position during the consolidation of the fiberboard mat to provide a consolidated panel having substantially uniform density, or at least a substantially more uniform density, that varies substantially in caliper due to the fiber-void regions.

9 Claims, 2 Drawing Sheets

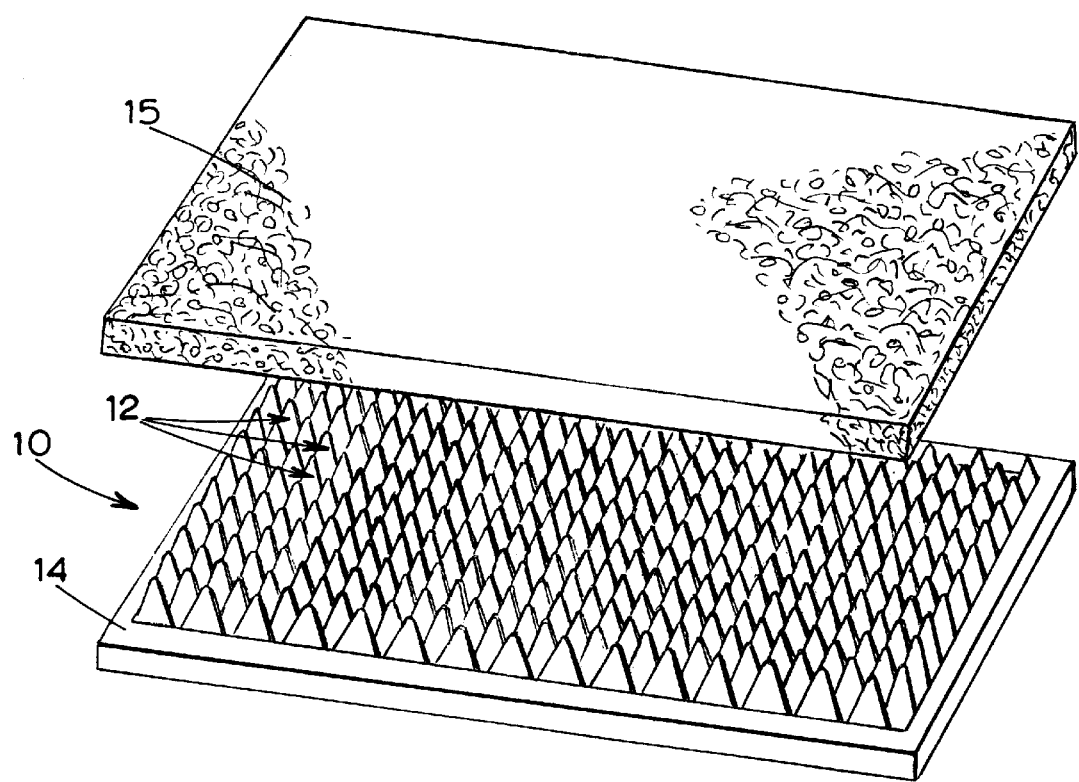
FIG. 1
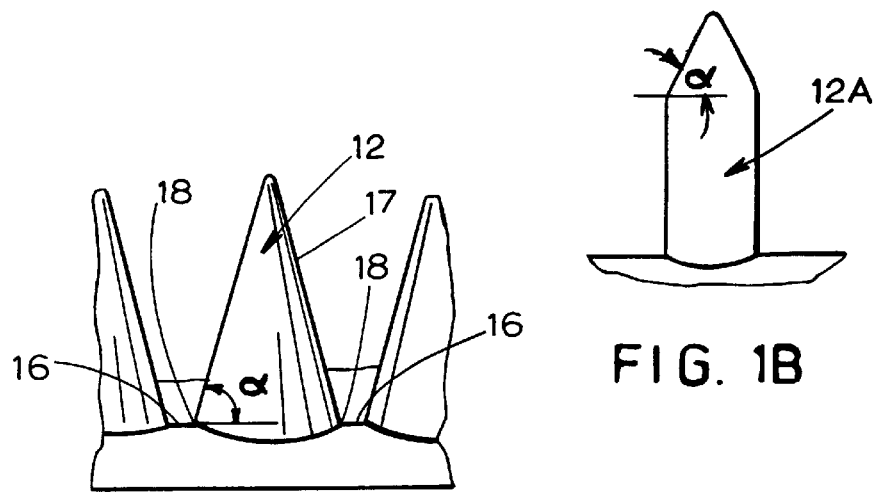
FIG. 1A
FIG. 1B

METHOD FOR PROVIDING MORE UNIFORM DENSITY IN THE MANUFACTURE OF LIGHTWEIGHT STRUCTURAL FIBERBOARD PANELS

FIELD OF THE INVENTION

This invention relates to a process for consolidating a man-made structural panel, and more particularly to a process for consolidating a man-made cellulosic panel having fiber-void regions to form a lightweight structural panel while achieving a substantially uniform density in the panel. More particularly, the present invention is directed to a method and apparatus for consolidating a fiberboard mat into a consolidated panel while redistributing fibers during consolidation, to achieve uniform density, while providing fiber-void regions, for lighter weight by consolidating a fiberboard mat against a fiber distribution die.

BACKGROUND OF THE INVENTION AND PRIOR ART

Man-made consolidated boards include hardboard, chip board, particle board, panel board, acoustical board, insulation board and the like. The uses of such boards depend upon the physical characteristics, such as the density of the board and any exterior embossing or decorative effect applied thereto.

There are two principal processes for the manufacture of man-made boards—the wet process and the dry process. In the wet process, the raw material is uniformly blended in a head box with copious quantities of water to form a slurry. The slurry is deposited onto a water-pervious support member, generally a Fourdrinier wire, where much of the water is removed leaving a wet mat of cellulosic material. The wet mat is transferred from the pervious support member and consolidated under heat and pressure to form the board. The dry process is similar to the wet process except that the cellulosic fibers are first coated with a thermosetting resin binder, such as a phenolformaldehyde resin, and are then randomly distributed into a mat by distributing the resin-coated fibers onto a support member.

The process of embossing a wet or dry mat in a platen press with a heated embossing plate is well known, especially in the manufacture of fiberboards, such as hardboard. An embossing plate is made with a surface contour or protrusions of a desired design, such as wood graining. The heated embossing plate is pressed against the surface of the wet mat under sufficient pressure to impress the plate design into the surface of the panel and thereby consolidate the wet mat into a decorative man-made board having varying thicknesses. The fiberboard mat that is hot-pressed, as inserted into the press, has a uniform thickness and a uniform basis weight. During hot-press embossing, areas of the fiberboard mat adjacent to the embossing plate protrusions necessarily become more compressed than flat or planar areas surrounding the embossed areas, and the consolidated, embossed product is, therefore, more dense at the embossed area.

The bonding necessary for cohesion and strength in a man-made board occurs during the consolidation of the board. Prior to hot-pressing, the loosely disassociated cellulosic fibrous mat is quite weak, but after hot-pressing the mat into its final configuration, it is very powerfully held together by the bonding which occurs during hot-pressing. Hot-pressing during consolidation causes a welding or coalescing of the cellulose fibers at the surface of the product so that the surface portion consists of wood remade in modified form.

The present invention is directed to a method of manufacturing a consolidated, structural panel by hot pressing a wet or dry fibrous mat in a heated press, against a back surface die that includes a plurality of upwardly extending projections to provide fiber-void regions in the back surface of the panel, for material savings and to provide lateral flow of fibers to aid in maintaining more uniform density throughout the panel. The panel thus consolidated has a relatively uniform density throughout its thickness due to lateral flow of fibers, as the fibers slide around an outer surface of the back surface die projections as the projections are pressed upwardly into the back surface of the structural panel. A more uniform density is achieved during consolidation, with die projections inserted into the back surface of the panel, since lateral compressive forces, generated as a result of the surface angle of the die projections, are substantially equal to the compressive force normal to the dies surfaces, as shown in FIG. 2. Forces on the fibers, as the die projections are forced in the mat, can be likened or modeled by compressible springs, A, B and C. As fiber is compressed in a normal (to die) direction the fiber will slide down the face of the pins until the lateral compressive force in the fibers between the projections, as indicated by compression of spring C, produces a balancing force. Adjustment of projection angle, $\alpha$, allows adjustment of the ratio of normal compression to lateral compression forces, and will allow for compensation for frictional effects from the outer projection faces.

The prior art includes the use of blades or pointed projections and the like, to tenderize or to provide a decorative surface to lumber and to densify weaker areas of consolidated fiberboards. The following patents are examples of tenderizing or decorating wooden articles: Voigt U.S. Pat. No. 839,680; Campbell III, et al. U.S. Pat. No. 3,231,455; and Clarke, et al. U.S. Pat. No. 4,790,360. This Assignee's Rinker U.S. Pat. No. 5,614,231, teaches that rigid fiberboard mats can be compressed into embossed door facings using a "push", or door panel embossed design, to provide denser areas in sharply embossed design areas to prevent "soft" edges. This Assignee's Beuving, et al. U.S. Pat. No. 5,129,435 discloses cutting incisions into a fiberboard mat, prior to hot press consolidation thereof, to condition the mat, by disrupting the fiber network and make the fibers more pliable. However, since the fibers are not held in any particular disrupted location during consolidation of the mat, in accordance with the Beuving, et al. process, substantially better density uniformity is not achieved.

SUMMARY OF THE INVENTION

In brief, the present invention is directed to a method of hot pressing a fiberboard mat that has a uniform thickness and a uniform basis weight to form a consolidated panel having void spaces within at least a portion of its thickness, while achieving more uniform density in regions where fiber extends from a top surface to a bottom surface of the panel as well as regions that include void spaces that extend into the undersurface of the panel.

In accordance with the principles of the present invention, fiber flow means or fiber distributing means, such as upwardly extending pins, is provided, against a back surface of the fiberboard mat, to penetrate into an undersurface of the fiberboard mat when the press is closed, for causing lateral flow of fiberboard fibers in a lateral or horizontal direction toward a base of the upwardly extending pins, and for holding the displaced fibers in position, during consolidation, until the fiberboard mat is completely consolidated and the binder resin is cured. The displaced fibers are maintained in position, laterally displaced from their original position in the non-consolidated mat, during consolidation, thereby achieving more uniform density in fiber-filled panel regions and the regions of the panel adjacent to fiber-void volumes corresponding in size and shape to the penetrated die projections.

Accordingly, one aspect of the present invention is to provide a method and apparatus for hot-press consolidation of a fiberboard mat into a consolidated panel having void regions, while achieving substantially uniform density throughout the fiber-filled regions of the panel.

Another aspect of the present invention is to provide a method and apparatus for hot-press consolidation of a fiberboard mat by subjecting the mat to heat and pressure against a fiber distributing die that is capable of causing the lateral flow or lateral displacement of fibers, and holding the laterally displaced fibers in position during consolidation of the fiberboard mat into a structurally sound, consolidated panel, such that the product has a substantially uniform density adjacent to thinner, or fiber-void regions, and thicker, or fiber-filled regions of the panel.

The above and other aspects and advantages of the present invention will become more apparent from the following detailed description of the preferred embodiment taken in conjunction with the drawings.

BRIEF DESCRIPTION OF THE DRAWINGS

FIG. 1 is a perspective view of a preferred embodiment of a fiber-displacement die of the present invention including upwardly extending projections over its entire upper surface;

FIG. 1A is a perspective, enlarged view of a portion of the fiber-displacement die of FIG. 1;

FIG. 1B is a perspective, enlarged view of another embodiment of a projection shape for the fiber-displacement die of FIG. 1.

DETAILED DESCRIPTION OF THE PREFERRED EMBODIMENTS

Figure 2:
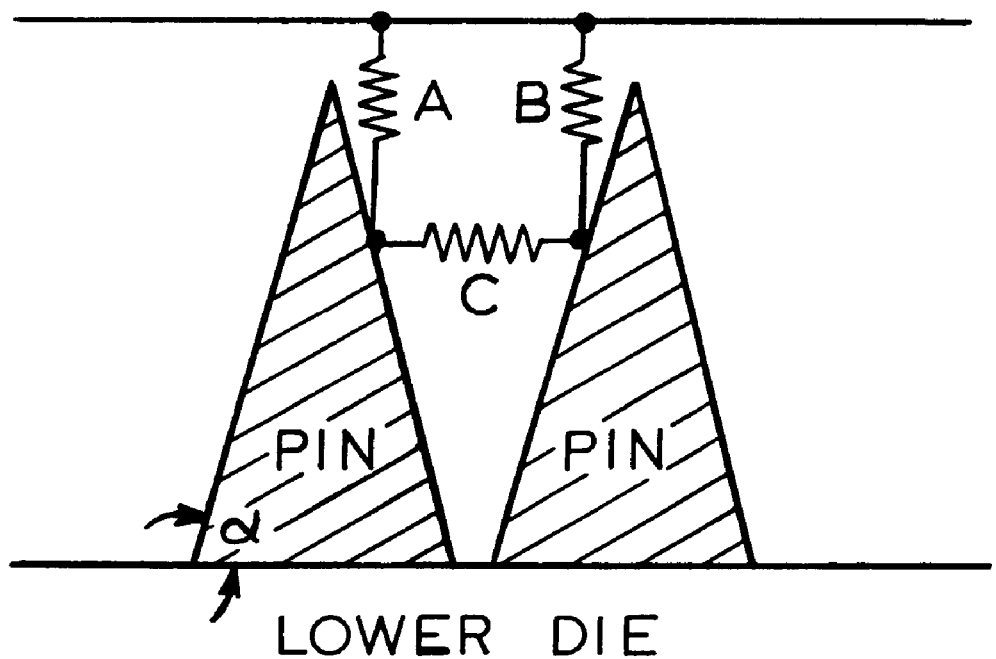
FIG. 2 is a view of a pair of adjacent projections wherein lateral forces on fibers being penetrated by the projections are schematically illustrated by compressible springs A, B and C.

In accordance with the principles of the present invention, it has been found that a fiberboard mat, whether made by a dry process, a wet process, or dry/wet combination thereof, can be consolidated against a fiber displacement die, including upwardly extending projections that contact and penetrate into a back major surface of the fiberboard mat, to provide substantial material savings while achieving more uniform density in thick (fiber-filled) and adjacent to thin (projection-penetrated) panel regions. The fiber displacement die includes a plurality of pointed projections that serve to laterally displace fibers, during hot-press consolidation—the displaced fibers being held in their displaced position during the consolidation of the fiberboard mat. The result is a consolidated panel having substantially uniform density, or at least a substantially more uniform density, that varies substantially in caliper due to the fiber-void, projection-penetrated regions of the panel.

Turning now to the drawings, and first to FIG. 1, there is shown a preferred embodiment of the fiber displacement die of the present invention, indicated generally by the reference numeral 10. As shown in FIG. 1, the preferred fiber displacement die 10 includes a plurality of spaced, conically shaped pins, indicated generally by reference numeral 12, extending vertically upwardly from a die base 14, so that when the fiber displacement die 10 is compressed against a back side of a fiberboard mat 15 being consolidated, the pins 12 penetrate into the back major surface of the mat 15. The preferred conical shape of the pins 12 causes lateral displacement of fiber from the fiberboard mat toward the "valleys" 16 between pins 12 as the fibers slide downwardly over an angled outer surface 17 of the pins 12 toward a base 18 of each pin 12. It should be understood that the outer surface 17 of the pins 12 should be sloped at an upper portion thereof to allow for smooth lateral movement of fibers when the pins are being inserted during press closing, but the slope may then become vertical, such as in bullet-shaped projections 12A, as shown in FIG. 1B.

The projections 12 or 12A remain stuck into the undersurface of the fiberboard mat during hot-press consolidation of the mat into a consolidated, structural panel and, thereby, hold the redistributed fibers in their displaced positions until the fiberboard binder resin is fully cured, thereby permanently maintaining the redistributed fibers in the desired location. Upon completion of the press cycle, the press is opened and the projections 12 slide out of the undersurface of the mat, leaving a ribbed back surface corresponding to a series of fiber-void conical depressions left by the projections 12. If desired, two such structural panels can be adhesively secured, back to back, to form a structural panel having planar surfaces on both major surfaces. Normally, however, the ribbed back surface of the panel will be positioned against a wall, or the like, so that the ribbed appearance of the back surface of the panel will not be seen.

To achieve the full advantage of the present invention, as best shown in FIG. 1A, the outer surface 17 of the projections 12 should be angled, with respect to the planar base 14 of the die surface from which the projections 12 extend upwardly, at an angle $\alpha$ (FIG. 1A) of at least about 45°, preferably in the range of about 50° to about 60° to achieve easy separation from the undersurface of the consolidated panel, after the hot-press consolidation process is completed, and for best density uniformity throughout the consolidated panel. It should be understood, however, that the projections can be lubricated or formed from a lubricious material, or include a non-stick surface material, such as polytetrafluoroethylene, that can withstand the temperatures of the pressing process so that smaller pin outer surface angles should be possible. Also, it has been found that to achieve the full advantage of the present invention, the projections 12 should be sharply pointed and the die 10 should have a pin-to-pin spacing (measured between pin apexes) smaller than the caliper of the consolidated panel. It should be understood, however, that other cross-sectional configurations for projections 12, such as a hexagonal cross-sectional shape are also useful and would enable the placement of more pins in the fiber displacement die, allowing for angles $\alpha$ up to about 89°. An elongated pointed ridge would not function since the fiberboard fibers would drape over the ridge instead of being displaced. The possibility of a knife-sharp ridge that would sever draped fibers exists but has not been tested. This variation should be considered as part of this disclosure.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the process may be varied substantially without departing from the spirit of the invention, and the exclusive use of all modifications which come within the scope of the appended claims is reserved.

What is claimed is:

1. In a method of consolidating a fiberboard mat into a fiberboard panel comprising disposing a fiberboard mat between a first die and a second die during hot-press consolidation thereof into a structural panel; and pressing said fiberboard mat between said first and second dies under heat and pressure to consolidate said fiberboard mat into a structural panel, the improvement comprising:

said second die including a plurality of spaced tapered projections extending vertically from a base thereof such that upon pressing under heat and pressure during consolidation of said mat into a fiberboard panel, said projections are pressed into said fiberboard mat, thereby causing some of the fibers in said fiberboard mat to flow laterally around an outer surface of said tapered projections during consolidation such that the resulting consolidated fiberboard panel includes fiber-void regions in one major surface thereof, corresponding in location to said projections on said die, while maintaining density uniformity in the fiberboard panel.

2. In the method of claim 1, wherein the projections extending from said second die are cone-shaped.

3. In the method of claim 1, wherein an internal angle of taper α of said projections is at least 45°.

4. In the method of claim 3, wherein an internal angle of taper α of said projections is at least 50°.

5. In the method of claim 4, wherein an internal angle of taper α of said projections is in the range of 50° to 60°.

6. In the method of claim 1, wherein the projections of the second die are bullet-shaped.

7. In the method of claim 3, wherein an internal angle of taper α of said projections is in the range of 45° to 89°.

8. In the method of claim 4, wherein the spacing between projections on the second die, as measured between projection apexes, is smaller than a thickness of the consolidated, fiberboard panel.

9. In the method of claim 8, wherein the projections have a height that is greater than the thickness of the consolidated panel such that the consolidated fiberboard panel includes apertures in an upper surface, corresponding to locations of said projections, when removed from the press.

* * * * *